United States Patent [19]

Wiens

[11] Patent Number: 5,071,075

[45] Date of Patent: * Dec. 10, 1991

[54] SOLID WASTE DISPOSAL

[76] Inventor: Thomas J. Wiens, 5233 S. Ironton Way, Englewood, Colo. 80111

[*] Notice: The portion of the term of this patent subsequent to Oct. 17, 2006 has been disclaimed.

[21] Appl. No.: 416,711

[22] Filed: Oct. 3, 1989

Related U.S. Application Data

[63] Continuation-in-part of Ser. No. 220,791, Jul. 18, 1988, Pat. No. 4,874,134.

[51] Int. Cl.[5] .............................................. B02C 21/00
[52] U.S. Cl. .......................................... 241/19; 71/14; 71/64.04; 241/24; 241/25; 241/797; 241/101.2; 241/DIG. 38
[58] Field of Search ................ 71/9, 12, 13, 14, 64.03, 71/64.04; 241/19, 20, DIG. 38, 80, 97, 24, 79.1, 29, 77, 25, 21, 37.5, 31, 154, 81, 101.2

[56] References Cited

U.S. PATENT DOCUMENTS

| | | |
|---|---|---|
| 3,524,594 | 8/1970 | Anderson et al. . |
| 3,557,685 | 1/1971 | Schoering . |
| 3,738,483 | 6/1973 | MacKenzie . |
| 3,741,863 | 6/1973 | Brooks . |
| 3,925,198 | 12/1975 | Eckjoff et al. . |
| 4,065,282 | 12/1977 | Morey . |
| 4,077,847 | 3/1978 | Choi et al. . |
| 4,134,731 | 1/1979 | Houser . |
| 4,187,775 | 2/1980 | Flender . |
| 4,264,352 | 4/1981 | Houser . |
| 4,341,353 | 7/1982 | Hamilton et al. . |
| 4,460,131 | 7/1984 | Cerroni . |
| 4,553,977 | 11/1985 | Fry . |
| 4,610,396 | 9/1986 | Carbonella Serra et al. .... 241/31 X |
| 4,874,134 | 10/1989 | Wiens ..................................... 241/19 |

FOREIGN PATENT DOCUMENTS 8401119 11/1985 Netherlands .

Primary Examiner—Mark Rosenbaum
Attorney, Agent, or Firm—Bachman & LaPointe

[57] ABSTRACT

A system and a process for treating solid waste are disclosed. The system includes a facility having one or more treatment lines for processing the solid waste to recover recyclable and useful materials such as corrugated paper, ferrous metals, plastic products, paper, and glass and to form various fractions which can be converted to a compost material. The facility is a substantially zero discharge facility having a minimal environmental impact.

42 Claims, 6 Drawing Sheets

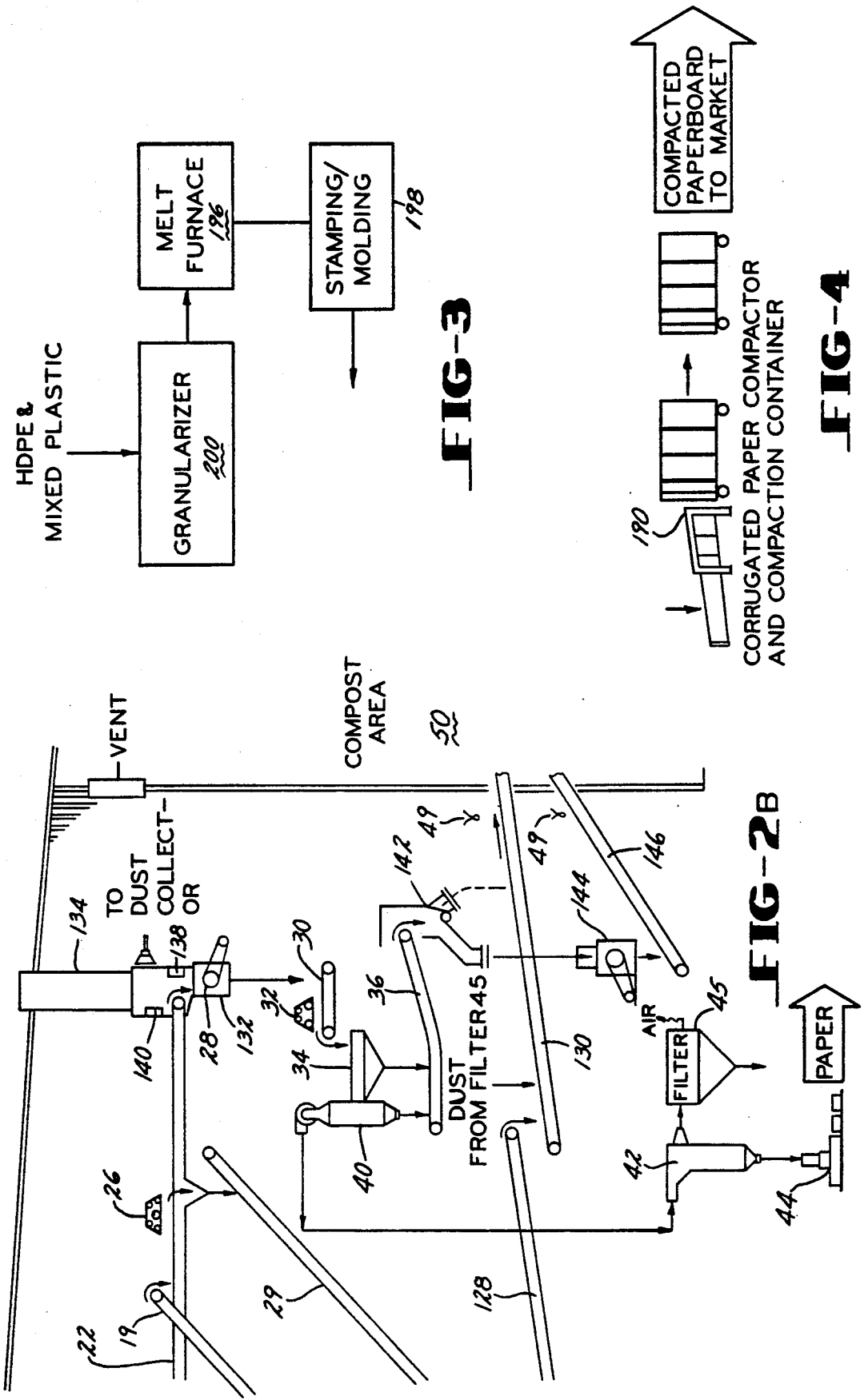

SOLID WASTE DISPOSAL

CROSS REFERENCE TO RELATED APPLICATION(s)

This is a continuation-in-part of allowed U.S. Patent application Ser. No. 220,791, filed July 18, 1988, for Solid Waste Processing Facility and Processing by Thomas J. Wiens now U.S. Pat. No. 4,874,139.

BACKGROUND OF THE INVENTION

The present invention relates to a process and a facility for treating solid waste materials to separate out and recover usable materials and for forming a commercial compost from a recoverable biodegradable waste material fraction.

Solid waste materials such as household garbage and commercial trash from retail establishments, apartments, offices and warehouses have traditionally presented problems of disposal. These problems have become increasingly critical in recent years as a result of a rapidly increasing population and a dramatic increase in the per capita production of solid waste. Additional disposal problems have been created by the change in character or composition of municipal waste as a result of the movement away from metal, wood and glass packaging toward paper and plastic packaging.

Currently solid waste is disposed of by incineration and/or land fill. Incineration is rapidly becoming a non-viable alternative in heavily populated areas. The public outcries against air pollution from the burning of waste materials has halted nearly all new incinerator construction. Similar problems surround new landfills. Environmental restrictions as well as land usage demands for housing have reduced the number of sites available for landfills.

In response to these waste disposal problems, both the government and the public have demanded that wherever possible recycling be employed both to conserve material resources and to reduce pollution problems. Efforts have been made to recover valuable resources such as glass, plastic, paper, aluminum and ferrous metals from waste materials. A variety of systems and techniques for recovering these resources from solid waste materials have been developed. U.S. Pat. Nos. 3,738,483 to MacKenzie, 3,925,198 to Eckhoff et al., 4,077,847 to Choi et al., 4,187,775 to Flender, 4,341,353 to Hamilton et al., and 4,553,977 to Fry as well as Netherlands Patent No. 8401119 illustrate some of the known systems for separating and recovering recyclable materials contained in municipal and/or industrial waste.

While most systems are designed to recover as many recyclable materials as possible, some are designed to recover specific materials and/or form specific products. U.S. Pat. Nos. 3,557,685 to Schoering, 3,741,863 to Brooks, and 4,460,131 to Cerroni for example illustrate systems and processes for recovering paper products, cardboard and/or other types of waste cellulosic materials. U.S. Pat. No. 4,065,282 to Morey illustrates a method for recovering glass from municipal waste.

Some systems take a recovered fraction and process it into fuel or some other useful product. U.S. Pat. No. 3,524,594 to Anderson et al. for example transfers a remaining refuse portion containing organic waste to digester tanks for composting. U.S. Pat. Nos. 4,134,731 and 4,264,352 both to Houser illustrate a system for separating out various waste material fractions and for converting a recovered wetted paper fraction into a compost.

The components in each of these systems are specifically arranged and designed to recover certain individual fractions such as combustible organic materials, aluminum, ferrous metals, glass, plastic, and miscellaneous bulky inorganic material. Efficient resource recovery depends upon separating the maximum amount of desirable material from the refuse using relatively few separating components. It also depends upon minimizing the percentage of unwanted materials in the individual fractions.

Accordingly, it is an object of the present invention to provide an economically viable, efficient process for treating solid waste material to separate out and recover recyclable materials.

It is a further object of the present invention to provide a process as above for forming a commercially useful compost from biodegradable waste products and other useful inert materials recovered from the treated waste material.

It is yet another object of the present invention to provide a zero discharge facility for performing the above process.

It is still another object of the present invention to provide a process and a facility as above which have a minimal environmental impact.

These and other objects and advantages will become more apparent from the following description and drawings.

SUMMARY OF THE INVENTION

The foregoing objects and advantages are achieved by the process and the system of the present invention.

Solid waste material to be processed is brought to a receiving station. Non-processable and bulky processable materials are removed manually at the receiving station. The waste material is then divided into three fractions by passing it through a trommel screen. A first fine fraction is conveyed to a composting area either with or without further processing depending upon its composition. A second intermediate fraction and a third large fraction are then passed to a station where recyclable materials are manually removed. The recyclable materials so removed include aluminum, glass, corrugated paper, PET plastic, and HDPE and mixed plastics. The second and third fractions are then combined and passed to a primary comminuting station. Prior to comminution, ferrous materials are removed from the second and third fractions. After being reduced in size, the waste material passes through a vibrating screen conveyor for removing a fine debris fraction including dust, glass and leaves. Thereafter, a paper fraction is removed using a pneumatic separation system. The remaining waste material forms a biodegradable fraction which is transferred to a compost area. The biodegradable fraction may be transferred by itself or it may be mixed with the fine fractions removed by the trommel screen and/or the vibrating screen conveyor.

The biodegradable and fine fractions are formed into a compost material by mixing water and/or sewage sludge into these fractions so as to adjust the solids content to a value in the range of 40%–60%. Thereafter the material is placed into windrows, fluffed and aerated, and adjusted to a temperature in the range of from about 55° C. to about 65° C. This temperature is maintained for a period of 3 to 28 days. Thereafter, the material is screened, shredded and blended with a portion of the fine debris fraction or other material and/or nutrients to form the commercial compost product.

Further details of the waste disposal system and process will be brought out in the following description.

One of the primary advantages of the system of the present invention is that it is a zero discharge system. There is no effluent stream leaving the system. There also are no water or air pollutants leaving the system. Substantially all acceptable materials brought into the waste processing facility are recovered.

BRIEF DESCRIPTION OF THE DRAWINGS

FIGS. 2a and 2b are a schematic representation of a treatment line in accordance with the present invention;

FIG. 3 is a schematic representation of a station for processing recovered HDPE and mixed plastics;

FIG. 4 is a schematic representation of a station for processing recovered corrugated paper;

DETAILED DESCRIPTION

Table I represents an adjusted national average composition for solid municipal waste as determined by the Environmental Protection Agency. Adjustments have been made to allow for recent ordinances which affect the contents of beverage glass, plastic bottles and cans, most of which are now redeemed for their five cent deposit valve.

TABLE I

PROJECTED AVERAGE WASTE COMPOSITION AND FEED RATE

| COMPONENT | TPH | PERCENT BY WT. |
|---|---|---|
| Moisture | 6.50 | 26 |
| Inorganic (Ash, stones, dirt fines) | 0.50 | 2 |
| Organics (Yard waste, garbage, leaves) | 5.61 | 22.45 |
| Paper (Magazines, packaging, etc.) | 4.00 | 16 |
| Newsprint | 1.00 | 4 |
| Corrugated | 1.75 | 7 |
| Plastic, Rubber | 1.00 | 4 |
| Textiles | 0.25 | 1 |
| Wood | 0.75 | 3 |
| Glass | 1.70 | 6.8 |
| Metal | 1.90 | 7.6 |
| Aluminum | 0.04 | 0.15 |
| TOTAL | 25.00 | 100 |

The process and facility of the present invention are designed to accept municipal solid waste such as that shown in Table I including brush, trees and stumps and to process the waste at a rate of about 25 tons per hour. Materials exempted from treatment are hazardous waste, tool steels, reinforced concrete, white goods such as refrigerators, washers, driers, ranges and the like, automobile scrap metal, materials larger than 47" wide and/or 48" high, flammables or explosives such as paint, gasoline, propane bottles, and dynamite, and infectious waste. The present process and facility recover corrugated paper, glass, plastics, redeemables, non-ferrous metals, magnetic metals and baled paper as well as form a compost from the remainder of the process residue which primarily consists of biodegradable materials and inert materials.

Figure 1:
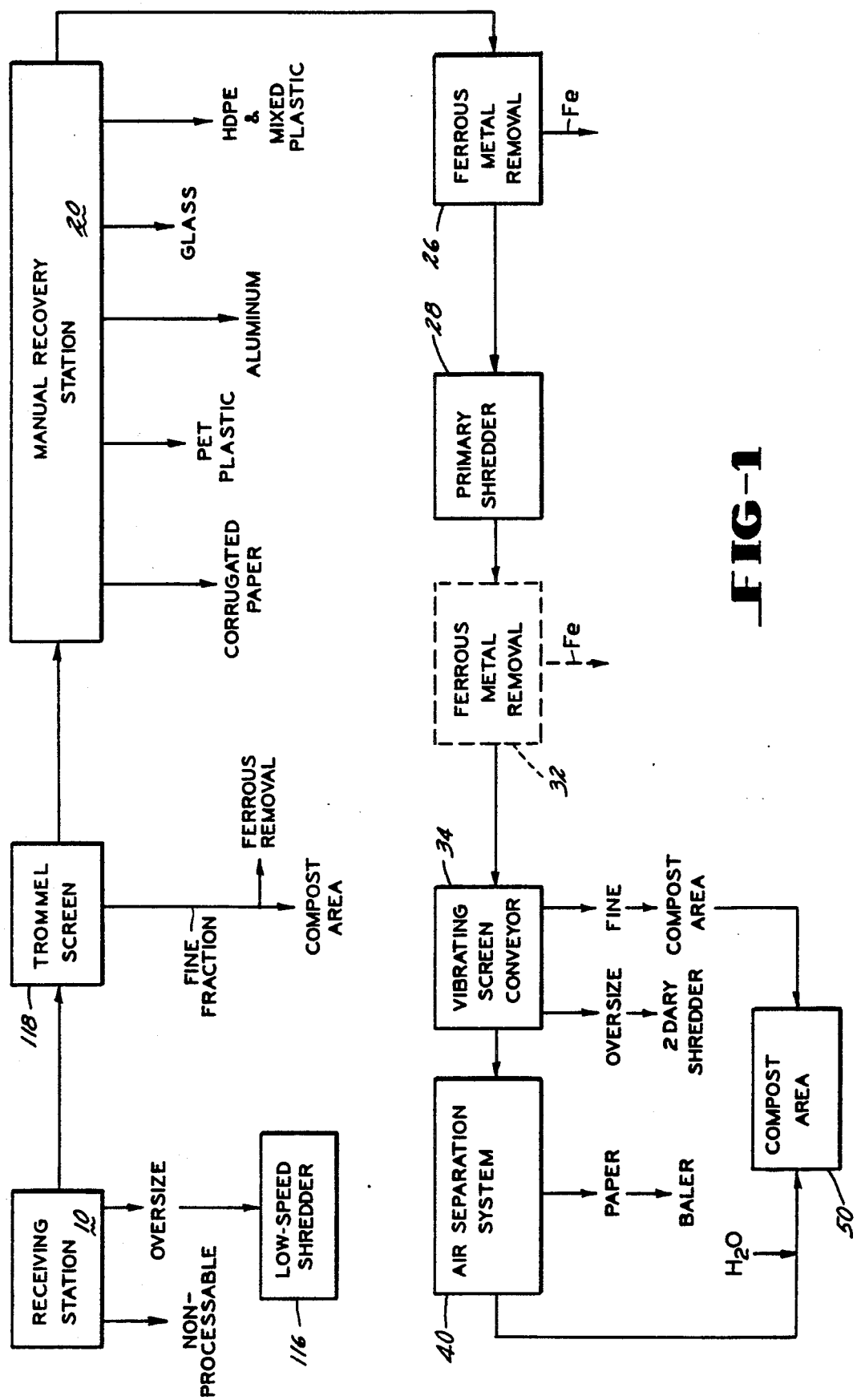
FIG. 1 is a flow chart showing the broad process for treating the solid waste material.
Figure 2A:
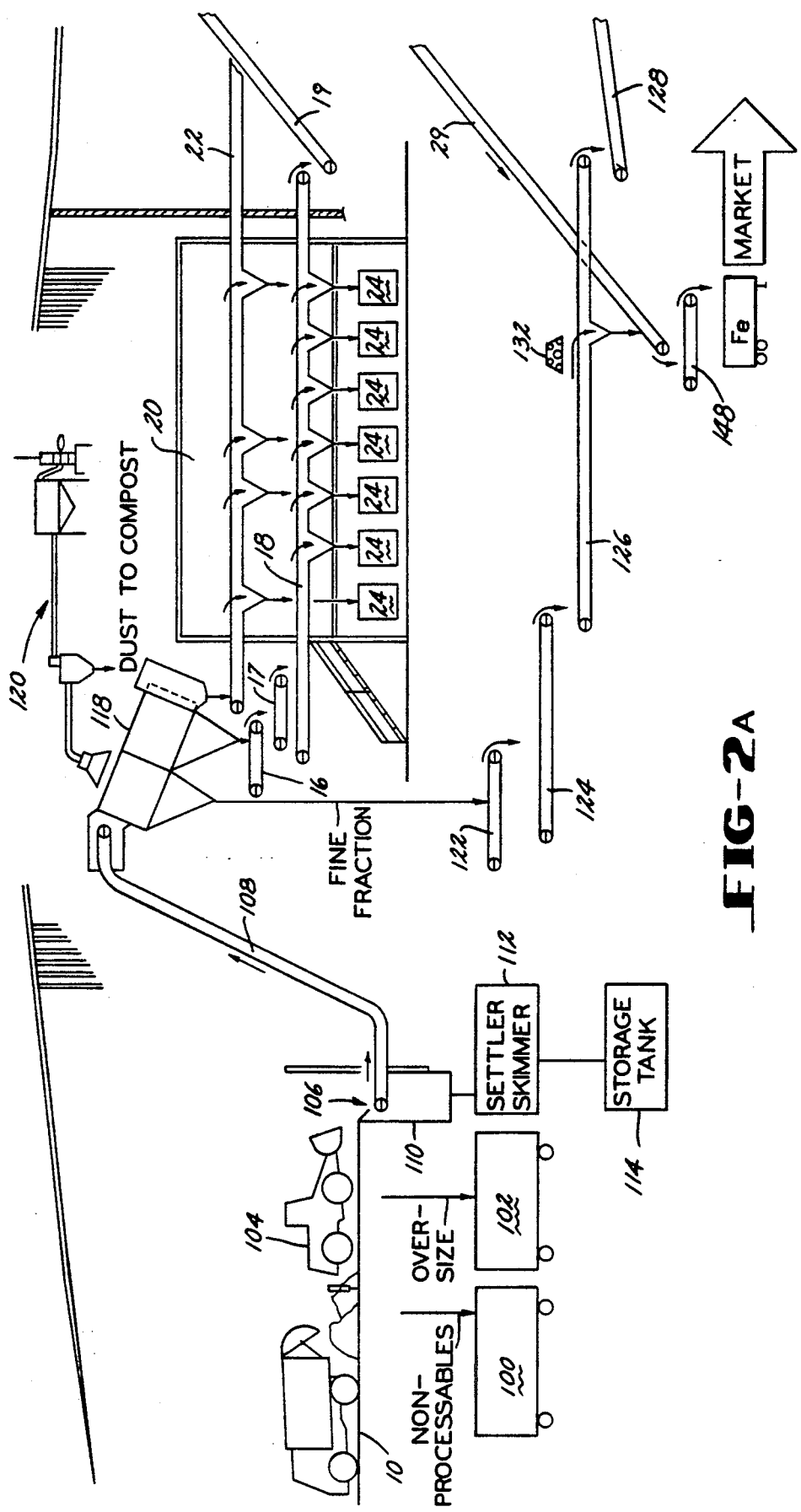

Referring now to the figures, the waste handling and recovery process employed in the present invention is broadly outlined in FIG. 1. Incoming truckloads of untreated municipal solid waste are initially weighed and ticketed at a scale house and assigned a dump area by the scale operator. The trucks discharge their waste onto a tipping floor 10 which forms a receiving station. Sorters on the floor open any bags or boxes and remove non-processables and oversize valuable processables. The sorters also scavenge items of high economic value such as corrugated paperboard or baled newspaper for direct recycling without additional processing. The non-processables and oversize valuables are placed in roll-off containers 100 and 102 for temporary storage pending transfer or further processing. Front-end loaders 104 may be used as necessary to assist in moving the non-processables and oversize valuables.

The tipping floor 10 is designed to be extremely durable. Constructed of smooth concrete and topped with a hardened, metal-impregnated wear surface, it will resist the continuous abrasion from machinery and permit thorough, daily cleaning. Each waste treatment line begins at a recessed opening 106 which houses a trommel feed conveyor 108 and a floor wash-down sump 110. The conveyor is situated at a level about 5 inches below the tipping floor surface, which allows the waste material to be pushed onto the conveyor by a front-end loader. The sump 110 serves to collect any liquid drainage from the tipping floor as well as excess washwater from daily cleaning operations. Trash washed into the sump(s) is caught by clean-out screens not shown and can easily be removed and returned to the process. Any collected washwaters and drainage are pumped to a settler-skimmer 112 for solids removal prior to pumping to the process water storage tank 114 to be later used to moisten the shredded and sorted waste. This process water is not discharged to the municipal sewer.

The oversize processables in the roll-off container 102 are transported by tractor to a low-speed shredder 116 in a compost grinding area for further processing, The shredder 116 may comprise any suitable shredder known in the art. In addition to the oversize processables, truckloads of oversized wood waste and construction debris may be directly routed to the low-speed shredder 116. These materials may be processed separately for direct marketing as animal bedding or sawdust for hog fuel, and can also be used as a bulking agent in the compost. Preferably, the shredder should be able to handle wood and other organic materials with maximum dimensions of 4 feet by 6 feet, reducing goods to particles 3 inches and smaller.

The trommel feed conveyer 108 transfers waste material to a trommel screen 118 for separation into a first fine fraction and at least one other fraction. In a preferred embodiment, the trommel screen comprises a rotary screen separator for separating the waste into a first fine fraction, an intermediate size fraction and a large size fraction.

The trommel screen is preferably monitored from a control room not shown and requires no operators. It is equipped with a local start-stop lockout switch for emergencies. Maintenance consists of regular visual inspection, periodic oiling, drive chain adjustment, and screen replacement. At least once during every shift, the screen is inspected and plugged openings are cleared of debris. Inspection doors are located along each side of the trommel, and a manway door is located in the discharge chute. A dust hood, bag house and fan system 120 collects dust and particulates generated during trommel operation.

Approximately 20 tons of waste are fed to each trommel per operating hour. The sloped trommel conveyor deposits waste into the trommel barrel at a point 22 feet above the tipping floor. The barrel, which is 10½ feet in diameter and 40 feet long, slopes gently downward from that point. As it rotates, it propels the waste downward through the length of the barrel. The tumbling and rotating action breaks open any garbage bags and paperboard containers not previously opened and also classifies the waste by size.

Particles smaller than 1½ inch form the fine fraction and drop through the screen onto the trommel undersize conveyor 122. This fine material is generally organic. It may be conveyed to the composting area by conveyors 124, 126, 128 and 130 without further processing. If there is ferrous metal in the fine material being conveyed, it may be removed using an optional ferrous metal removing device 132 such as a magnet head pulley.

Remaining waste larger than 1½ inches but smaller than 4 inches by 6 inches drop from the larger openings in the trommel onto secondary conveyors 16, 17, and 18 and enters a sorting station 20. This waste stream is expected to contain mostly bottles and cans, and should be a fairly clean and easily sortable stream. The remaining material, larger in size, is discharged from the trommel screen onto a primary sorting conveyor 22 and enters the sorting station as well.

Recyclable products manually recovered within the sorting station include corrugated paperboard, glass bottles and jars, aluminum cans and materials, other ferrous and non-ferrous metals, and PET plastics. High density polyethylene HDPE and mixed plastics are also sorted, but may or may not be processed further. Non-processables are also removed in the sorting room. These materials may include objects which could cause personal injury, explosion, blockage within the shredders, or chemical contamination of the compost.

As recyclable materials are removed from the waste stream, they are dropped through designated chutes from which they fall into compactor containers or roll-off bins 24 situated below the sorting station floor. A compactor or baler may service each of the paperboard and mixed plastic streams and may be equipped with photoelectric sensing devices. As a result, each compactor does not require attendance. Compacted material is fed into 30-cubic yard containers. When a container is filled, an operator on the ground level removes it, replacing it with a staged empty container. The full container is then towed by tractor to a staging area where it awaits pickup by the recycling contractor.

Sorted glass, aluminum, PET, nonferrous metals, and rejects fall through the chutes into individual roll-off containers 24 located directly below each chute. To prevent glass redeemables from breaking, the glass chute may be gently sloped to reduce velocity. Aluminum materials may be baled, densified and/or flattened to meet a purchaser's specifications. Non-ferrous metals including aluminum removed from the waste material may be passed through a magnetic separator not shown for removing bi-metallic materials having a ferrous component.

The remaining waste is conveyed from the sorting room along the conveyors 19 and 22 which then converge, transporting the combined streams directly to the oversize material impact shredder 28. Before entering the shredder, the material passes below a belt magnet 26 for removing ferrous magnetic metals and depositing them onto conveyor belt 29.

The shredder 28 may comprise a hammermill having a 25 ton per hour operating capacity. It comminutes or reduces the waste material to particles 3 inches in size or smaller. The shredder 28 for safety reasons is isolated in a concrete explosion proof chamber 132 having an explosion vent 134 extending through the roof 136 of the structure housing the waste treatment line(s). In the unexpected event of an explosion within the shredder, the explosive force is directed upward to the outside of the building to assure the safety of the workforce and to protect process equipment. An explosion detection system 138 having means 140 for applying a fire retardant to prevent the spread of combustion caused by an explosion may be installed within the chamber 132.

Dust and particulates generated within the shredder are collected for cleaning and odor control by the trommel shredder hood, baghouse, and fan system 120.

Shredded material from the shredder drops to a feed conveyor 30 which sends it to a vibrating screen conveyor 34 where particles ⅜ inch and smaller are screened from the waste stream. If desired, a second magnetic head pulley 32 may be installed on the discharge conveyor 30 for removing a second ferrous metal fraction. The pulley 32 may remove remaining ferrous material such as nails, batteries and mattress springs from the waste material being discharged onto the conveyor 30. The pulley 32 removing this second ferrous metal fraction may comprise any suitable magnetic head pulley known in the art.

The non-magnetic discharge from the conveyor 30 is then transferred to the vibrating screen conveyor 34 which is used to remove fine debris under a particular size.

These small, heavier particles pass through the screen in conveyor 34 onto conveyor 36. The material is then transported to the compost area via flap gate valve 142 and conveyor 130.

The remaining material is passed to the air classifier 40. Those portions of the waste stream which contain high levels of materials which require further size reduction, such as wood materials, paper or construction debris drop out of the bottom of the classifier and may be diverted to a secondary impact shredder 144 by closing the flap gate valve 142. The shredder 144 may comprise any suitable shredder known in the art. Preferably, it further reduces the material to a minus 1½ inch size, exposing more surface area for bio-oxidation. It has been found that size reduction accelerates decomposition and enhances the final product by minimizing oversize rejects. Material from the shredder 144 may be transported to the compost area by conveyor 146.

The lightweight, larger fraction which does not pass through the screen is discharged to the air classifier 40 where the material passes through an upward-moving air stream, capturing various light-weight products and removing them from the material stream. As previously mentioned, the heavier portion falls onto conveyor 36 and is conveyed to secondary shredder or directly to composting.

The air velocity within the classifier 40 can be regulated to adjust for the desired quality of separation and to compensate for changes in atmosphere conditions, such as temperature and humidity, which affect the separation process. The air classifier is designed for three modes of operation:

Conveying all of the product from the vibrating screen conveyor to the air/material separator. This mode will be used when the product is mainly dry paper.

Conveying light-weight paper when the product from the vibrating screen conveyor is a mixture of paper and heavy-weight product.

Conveying of no paper to the separator.

The paper fraction from the classifier is pneumatically conveyed to an air separator unit 42 where the paper separation is made by a combination of screens and mechanical devices using centrifugal and gravitational forces. Product paper is typically collected in a baler 44 such as one designed to produce a 50-cf bale with a density of 25 lb/cf, an approximate 1,200 lbs/bale. A forklift operator transports the baled paper to the holding area for storage. The bales are eventually picked up by a paper recycler.

The exhaust air from the separator 42 flows to a rotary drum filter unit 45 which also houses a secondary filter and refillable activated carbon filter for odor removal. The dust collected by the filters is collected and returned to the process for addition to the compost stream via conveyor 130.

All ferrous metals picked up by magnetic separation at various points in the process fall onto a common ferrous metal conveyor 148, and are discharged into a trailer.

After removal of the paper fraction, the remaining material, which substantially consists of biodegradable material, is transferred by conveyors 36 and 130 to the composting area. This waste material mixes with the first fine fraction removed by the trommel screen 118. These materials are combined in the compost area with material delivered from the secondary shredder by conveyor 146.

Spraybars 49 may be mounted on the conveyors 130 and 146 to adjust the moisture content of the waste material to about 40%-60%. In cold periods, warm water may be sprayed onto the material to add to its heat content.

If desired, the spraybars 49 may be omitted. In such an instance, the solids content of the material may be adjusted after the material reaches the compost area 50. The compost area may have conventional water spray devices 51 for adding the desired amount of water. Alternatively, both spray means 49 and spray devices 51 may be used to adjust the solids content of the material entering the area 50.

Figure 7:
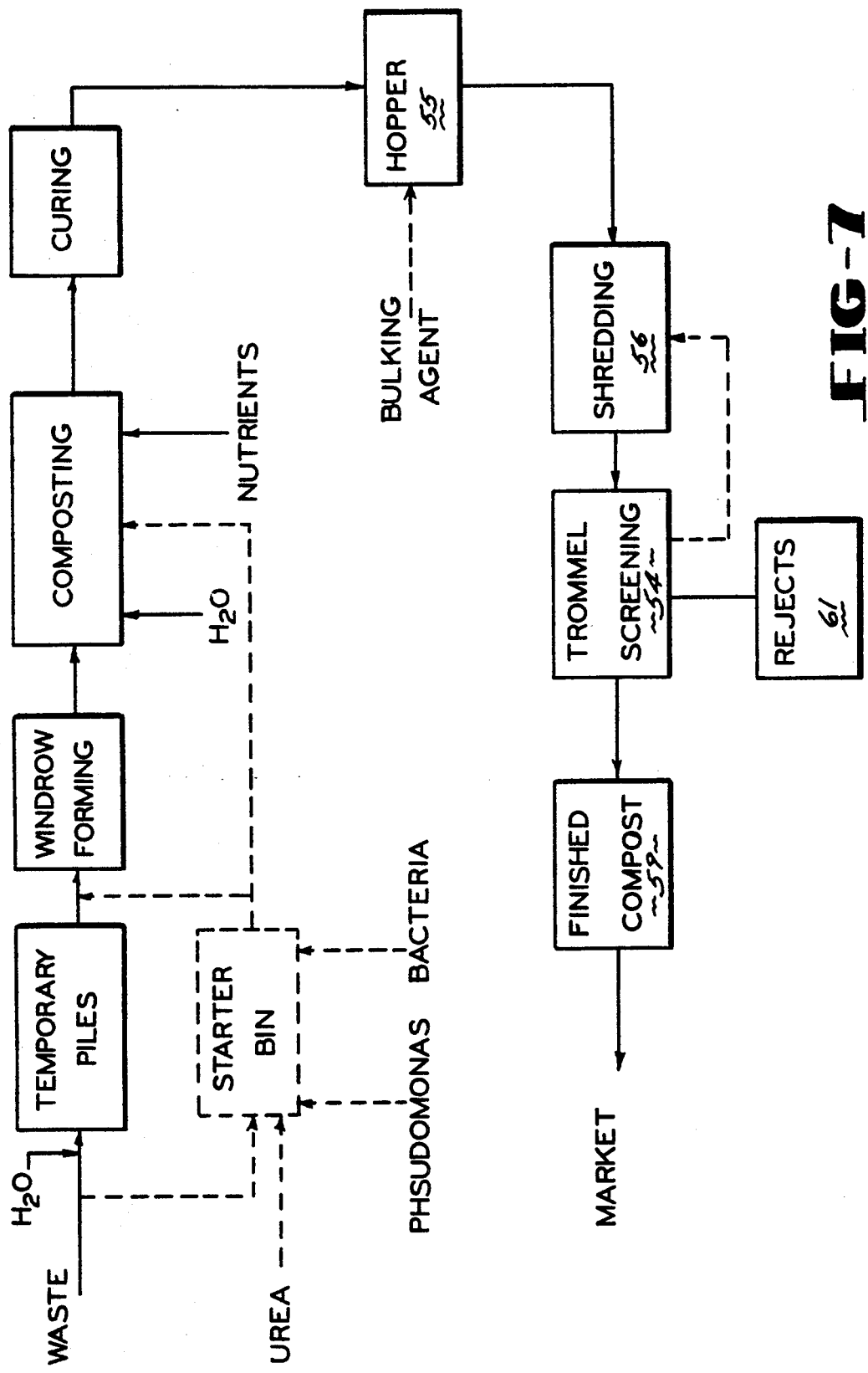
FIG. 7 is a flow chart showing the process for converting the biodegradable and fine fractions recovered from the waste material into a compost material.
Figure 8:
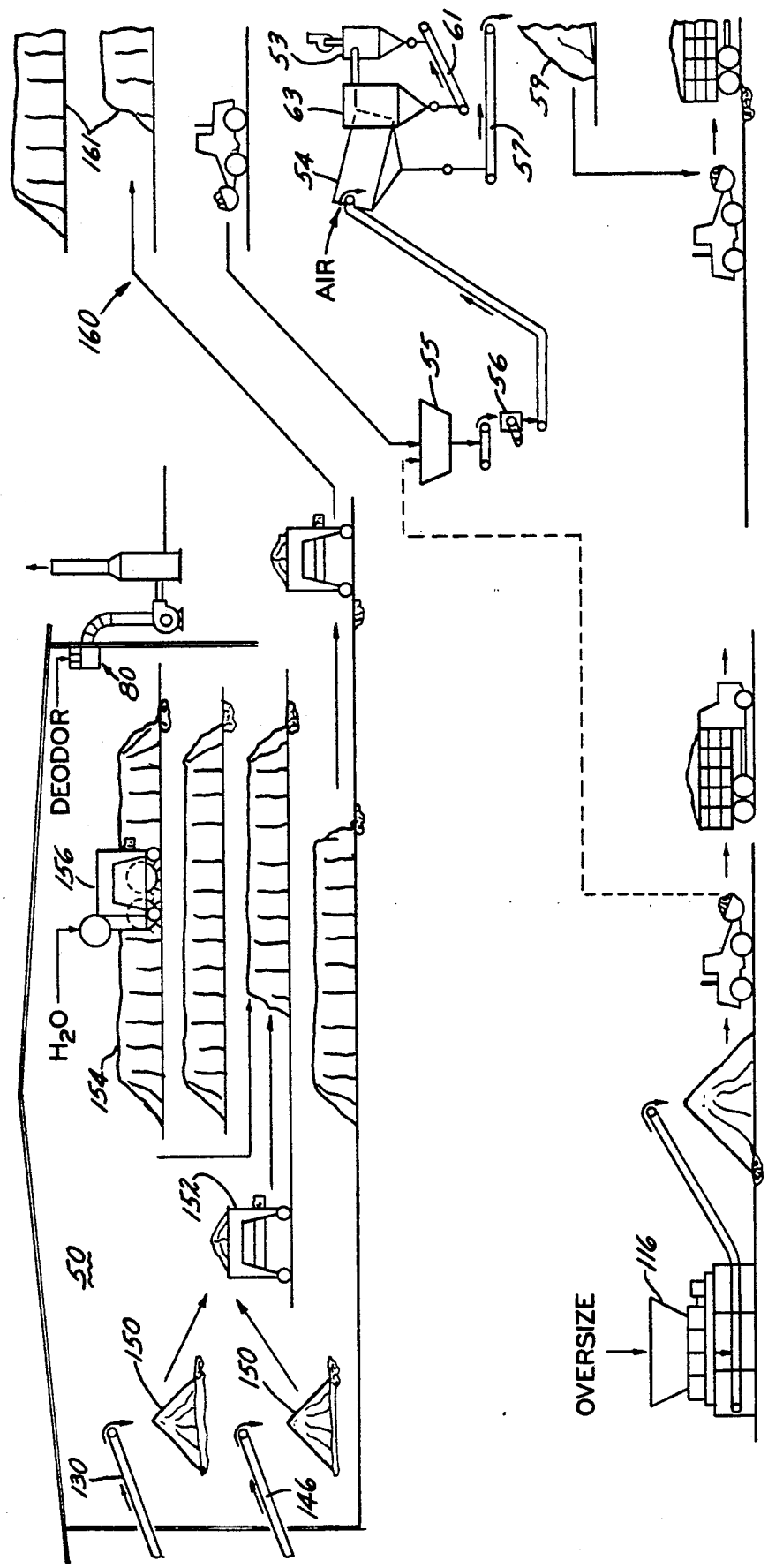
FIG. 8 is a schematic representation of the composting area.
Figure 5:
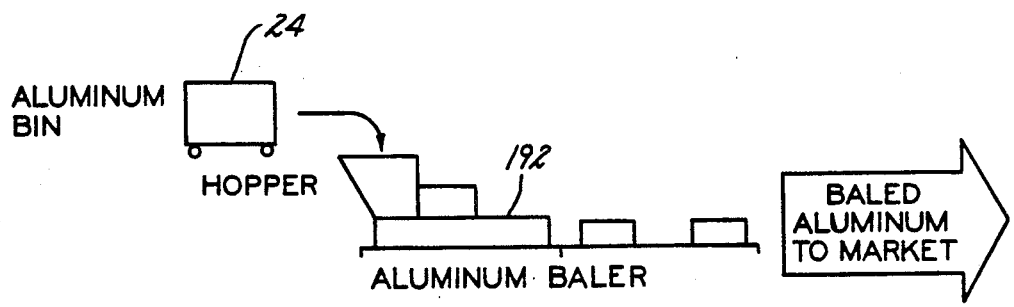
FIG. 5 is a schematic representation of a station for processing recovered aluminum.
Figure 6:
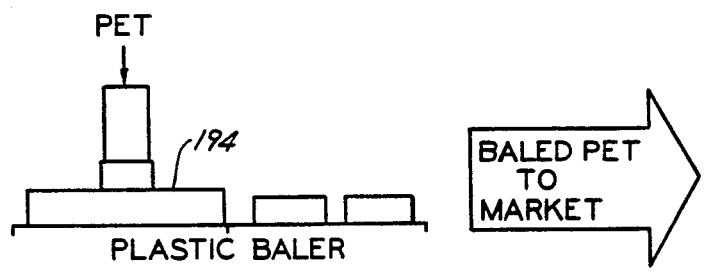
FIG. 6 is a schematic representation of a station for processing recovered PET plastic.

The processed waste material transported to the compost area is composted via a bio-oxidation process which is broadly shown in FIG. 7. Composting is carried out in an area separate from the treatment line area. The two areas may be separated by a wall while located in the same building. Alternatively, the two areas may be in two separate buildings.

The composting process used herein produces a compost free of objectionable odors and impurities which can be used in most institutional and commercial landscaping applications. The material is conducive to plant growth and contains both organics and inert substances which serve as bulking agents.

Windrow composting of the processed waste material is conducted in an enclosed, environmentally controlled area 50. This approach mediates swings in ambient temperatures, allow excellent control of moisture content and compost quality, and prevents fugitive emissions of dust and odors. When conducted correctly, composting, an aerobic process, does not produce objectionable odors. The proposed process has been designed to eliminate the possibility that the composting material will become anaerobic.

The raw compost streams from the waste process area, adjusted to 40%-60% moisture, are conveyed to the compost area and dumped into temporary piles 150. Front-end loaders or load-haul-dump (LHD) units 152 reclaim the incoming raw compost from the surge piles 150 and place it into windrows 154 on the composting room floor. The windrows are each about 20 feet wide and 8 feet high, with a 4-foot wide crest across the top. A 4-foot aisle is left between adjacent windrows.

The composting process used herein is a bio-oxidation process which produces heat in its comsuption of the organic matter. This heat is conducted by the moisture in the compost pile, and serves to destroy pathogen microorganisms and weed seeds residing in the remaining waste. These pathogens, e.g., Salmonella, are essentially destroyed if the temperature of the composting mass reaches about 65° C. and remains at that level for at least two days. The Environmental Protection Agency recommends a level of about 55° C. for at least three days. The composting system, as designed, raises or adjusts all composted materials to the desired minimum temperature of about 55° C. over a period of time, generally from one to eight weeks, with a 28 day period being preferred. Once the material has reached the desired temperature, it is kept at that temperature for a period of at least 3 days. Preferably, the material is maintained at a temperature in the range of from about 55° C. to about 65° C. for three to twenty eight days.

These temperature conditions are produced and maintained by first forming the compost into windrows 154 and if necessary adjusting the material to about forty to about sixty percent solids by adding water via spray devices 51. The compost material in each windrow is processed with a "Scarab" type machine 156 which straddles the pile and fluffs and aerates the material. The Scarab machine includes a rotating drum which flails the compost material as it traverses the length of the windrow.

Each segment of each windrow is continuously monitored and analyzed throughout the composting period. Careful management is exercised to precisely track each day's production through its windrow is turned approximately once every 2-3 days by the Scarab tractor. The Scarab hastens the breakdown of the organics in the waste and supplies fresh air to all parts of the pile. If lab results indicate the necessity, the Scarab can inject nutrients, such as nitrogen, into the material to enhance the composting action by maintaining the appropriate carbon to nitrogen ratios As the composting process progresses, each segment will lose volume through dehydration and loss of carbon dioxide. As each segment shrinks, LHD machines 158 collect some of the more mature compost from the windrows and combine it with newly placed organic material to accelerate the initial biological reactions.

During the composting period, samples from each segment of each windrow are analyzed to assure that the compost contains an adequate microbial population, and that the finished product will exhibit an acceptable carbon to nitrogen (C/N) ratio. While the incoming waste has an C/N ratio of abut 150:1; the final product preferably has a ratio in the range of 20:1 to 150:1.

After the composting cycle is complete, the compost is tested against finished compost criteria. If it passes, it is transported to the outdoor curing area 160 adjacent to the composting area, where it remains for a period of at least 30 days. The curing windrows 161, are turned and aerated every 10 days.

The cured compost is then transferred by an LHD machine to a compost sizing feed hopper 55. Thereafter the material is fed into a lump-breaker shredder 56 which reduces oversize particles to ⅜ inch. Shredded particles fall through the shredder's grate openings and are conveyed to a brushed trommel screen 54. The trommel operates under negative pressure supplied by a light-fraction collector through a plenum 63. The undersize, or minus ⅜-inch, stream is transferred by conveyor 57 to the finished compost stockpile 59.

The oversize stream from the trommel 54 is classified as rejects and transported to a reject pile by conveyor 61. These oversize materials are carried through the end of the brushed trommel 54 into the plenum 63 where the heavier particles fall onto the reject conveyor 61. The lighter fraction, which may contain fugitive plastic films and paper, are liberated by the rotary action of the trommel screen and are carried along the air stream into the light-fraction collector 53 which drops the particles through a rotary valve onto the reject conveyor. If desired, the oversize stream may be recycled through the shredder and reprocessed before being classified as rejects.

Since the compost is totally derived from municipal solid waste the appearance may affect marketability. Blending with soils or fine debris from the treatment line may be necessary to match the use with the product quality.

Figure 9:
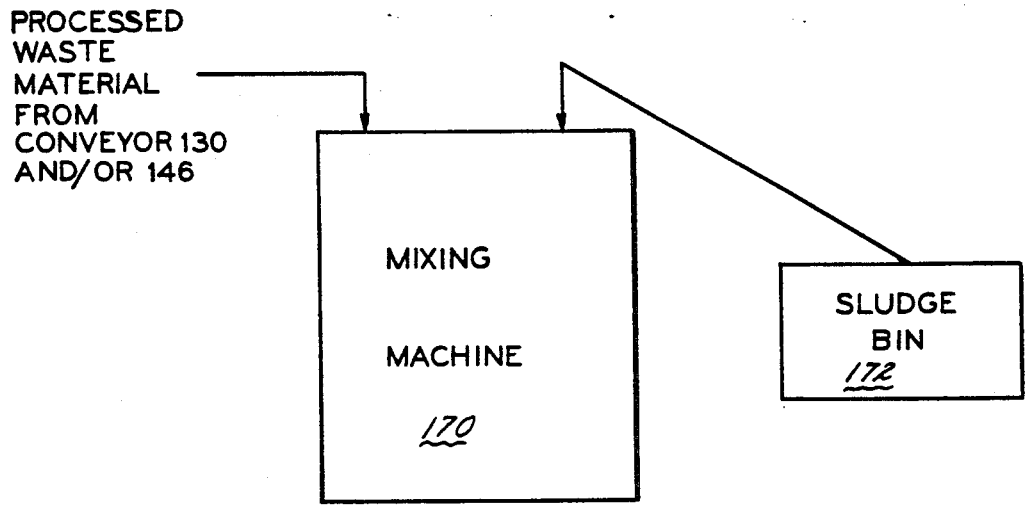
FIG. 9 is a schematic representation of a system for mixing sewage sludge into the compostable material.

The compost thus produced can be used as a soil amendment for landfill reclamation, construction sites, golf courses, flower potting and nurseries. If desired, industrially pre-treated sewage sludge may be added to the compost material during the composting process. The sewage sludge may be added either to the windrows or to the waste material entering the compost area. As shown in FIG. 9, waste material entering the compost area may be conveyed to a mixing machine 170 such as a pulping machine. Sludge stored in a bin 172 may be introduced into the pulping machine and blended with the processed waste material. The combined material should have a solids content of 40%–60%. It is then transported to compost piles to be made into windrows.

Alternatively, the composting process may be enhanced by diverting a portion of the processed waste material entering the compost area into a starter bin 180. Urea, phsudomonas and/or bacillus bacteria are added to this waste material to get naturally occurring bacteria to operate at an optimal rate and thereby increase the rate of bio-oxidation. The urea, phsudomonos and/or bacillus bacteria may be added in any desired manner. The amounts of each to be added will vary with the composition of the processed waste material. Once the bacteria are operating at the maximum rate, which may take three to five days, the treated material is introduced into the composting piles and/or windrows.

If desired, urea may be added into the waste material entering the compost area. The urea may be added in any desired manner such as mixing with water to be applied to the incoming material.

During composting, some carbon dioxide and ammonia are produced. Because of this, the compost area is preferably force-ventilated. Provisions are preferably made for scrubbing the exhaust air to control and remove odors and unwanted gases. These provisions may include a scrubber and an odor treatment system 80.

It should of course be recognized that two or more treatment lines may be used to process the waste material. Each treatment line may have the components shown in the figure. The processed waste material for composting will be transferred to the compost area via a series of conveyors or trailers.

If there is more than one waste material treatment line, the facility may be run in alternative fashions depending on the maximum economic value that can be derived from the feed stock. For example, during operation it may become apparent that certain trucks will dump high percentages of corrugated material. These can be collected and campaigned so that the higher value corrugated product can then be recovered and baled. Additionally, when trees and brush are treated they can be campaigned without operating the pneumatic paper conveying system. Then the wood chips can be collected for use as a bulking agent in the compost or collected and marketed separately.

Alternatively, one treatment line may be used in the standard manner described above, while a second line is used to treat particular segregated or campaigned materials such as trees, different types of paper or corrugated cardboard. It has been found that by doing this, one is able to get higher quality recyclables. When particular materials are being treated, various components of the line may be shut down. For example, when treating only trees or brush, the ferrous metal separators can be shut off.

As shown in FIGS. 3–6, materials recovered by the system of the present invention may be further handled to be placed into a marketable form. For example, corrugated paper removed in the manual separation phase may be compacted in compactor 190 or baled and sent to market. Similarly, aluminum and PET plastic may be baled by balers 192 and 194 and sent to market. HDPE and mixed plastic may be melted in an appropriate device 196 and stamped or molded by machine 198 into a finished product. A dye may be added to the melted material before stamping or molding to provide a substantially consistent color. Alternatively, the HDPE and mixed plastic may be granularized by device 200 before processing or may be granularized and sold. The various devices used to process these materials in the aforesaid manner are well known in the art and do not form part of the present invention.

As can be seen from the foregoing discussion, an efficient waste material recycling process and facility have been described. The facility can be appropriately termed a zero discharge facility. Substantially all incoming acceptable materials are recovered and recycled. In addition, the process and the facility recover a maximum amount of useful recyclable material using a relatively few number of steps and separating components. Besides being efficient, the process and facility present significant economic benefits. In addition to recovering useful resources, the process and facility produce a commercially salable compost product. From an environmental standpoint, the process and facility of the present invention have a minimal impact. There is no burning of materials which leads to air pollution nor preparation of materials to be burned. There is a minimal amount of material which needs to be transported to a landfill, thus reducing the impact on landfill sites reaching their capacity.

It is apparent that there has been provided in accordance with this invention a solid waste disposal system and process which fully satisfies the objects, means, and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A process for treating solid waste materials and forming a compost from biodegradable waste material fractions, said process comprising:
   receiving untreated solid waste material at a receiving station;
   manually removing bulky valuables and non-processable materials from said untreated waste material;
   separating said waste material into a first fine fraction, and at least one other fraction;
   conveying said first fine fraction to a composting station;
   separating redeemable materials including a first ferrous metal fraction from said at least one other fraction of said waste material;
   comminuting said at least one other fraction after separating out said first ferrous metal fraction;
   pneumatically separating a paper fraction from said comminuted waste material leaving a substantially biodegradable fraction; and
   forming a compost from said substantially biodegradable fraction and said first fine fraction.

2. A process according to claim 1 wherein said compost forming step comprises adding sewage sludge to at least one of said biodegradable fraction and said first fine fraction.

3. A process according to claim 2 wherein said adding comprises adding sewage sludge in an amount sufficient to create a compost material having a solids content in the range of from about 40% to about 60%.

4. A process according to claim 2 wherein said compost forming step further comprises:
   placing said at least one biodegradable and fine fractions and said sludge into compost material windrows adjusted to about 40%-60% solids content;
   fluffing and aerating compost material in said windrows by flailing said compost material with a fluffing and aerating means which traverses the length of each windrow; and adjusting said compost material in said windrows to a temperature in the range of from about 55° C. to about 65° C. and maintaining said temperature for at least three days.

5. A process according to claim 1 wherein said compost forming step comprises applying water to at least one of said biodegradable and fine fractions to adjust the solids content to about 40%-60% and forming said compost by bio-oxidation.

6. A process according to claim 5 wherein said compost forming step further comprises:
   placing said at least one fraction having an adjusted solids content of 40%-60% into compost material windrows;
   fluffing and aerating said compost material in said windrows by flailing said compost material;
   adjusting said compost material in said windrows to a temperature in the range of from about 55° C. to about 65° C.; and
   maintaining said temperature for at least three days.

7. A process according to claim 6 which further comprises:
   removing said compost material from said windrows;
   curing said compost material; and
   passing said compost material through a brushed trommel screen which passes minus ⅜″ materials to form a marketable compost; and
   recycling said shredded compost material to said trommel screen.

8. A process according to claim 1 wherein said fine fraction and at least one other fraction separating step comprises passing said untreated solid waste material through a trommel screen and separating it into said fine fraction, an intermediate fraction and a large fraction.

9. A process according to claim 8 further comprising:
   manually removing plastic, glass, and non-ferrous materials from said intermediate and large fractions.

10. A process according to claim 1 further comprising:
    magnetically separating a second ferrous metal fraction from said comminuted waste material.

11. A process according to claim 1 which further comprises providing a vibrating screen conveyor and removing a fine debris fraction including dust, glass, grass and leaves with said vibrating screen conveyor after said comminuting step and before said paper fraction separation step.

12. A process according to claim 1 further comprising:
    collecting water used during cleaning operations and any other liquid drainage in a sump;
    removing solids from said water and said liquid drainage; and
    applying said collected water and drainage to at least one of said biodegradable and fine fractions during said compost forming step.

13. A process according to claim 1 further comprising:
    shredding oversize and bulky organic materials; and
    adding said shredded organic materials to said compost as a bulking agent.

14. A process according to claim 1 wherein said redeemable materials separating step comprises removing HDPE and mixed plastic materials from said at least one other fraction.

15. A process according to claim 14 further comprising:
    melting said HDPE and mixed plastic materials;
    adding a dye to said melted HDPE and mixed plastic materials to provide a substantially consistent color; and
    forming said melted HDPE and mixed plastic materials into a desired product.

16. A process according to claim 14 further comprising:

granularizing said removed HDPE and mixed plastic materials.

17. A process according to claim 1 further comprising adding nutrients into the compost material to enhance the composting action and maintain a carbon to nitrogen ratio in the range of from about 20:1 to about 150:1 in the compost material.

18. The process of claim 1 further comprising:
diverting a portion of said biodegradable and fine fractions into a starter bin;
adding at least one of urea, phsudomonas and bacillus bacteria to said diverted portion in said starting bin to form a compost enhancing material; and
introducing said compost enhancing material into the compost material to accelerate the composting process.

19. The process of claim 1 wherein said first fine fraction is conveyed to said composting station without further processing.

20. The process of claim 1 further comprising:
removing a second ferrous metal fraction from said first fine fraction prior to it reaching said composting station.

21. A process according to claim 1 further comprising:
adding urea to at least one of said biodegradable and fine fractions.

22. A system for treating solid waste materials and forming a compost from biodegradable waste material fractions, said system comprising:
a station for receiving untreated solid waste material;
means for removing bulky valuable and non-processable materials from said untreated solid waste material while said material is in said receiving station;
means for conveying said waste material less said bulky valuable and non-processable materials to at least one treatment line; and
each said treatment line including means for separating said waste material into a first fine fraction and at least one other fraction, means for conveying said first fine fraction to a composting area, a first station for manually removing plastic and non-ferrous metal materials from said at least one other fraction, a second station for separating a first ferrous metal fraction from said at least one other fraction, first means for comminuting said at least one other fraction after it passes through said second station, a third station for separating a paper fraction from said comminuted material and thereby leaving a substantially biodegradable fraction, and means for conveying said biodegradable fraction to said composting area.

23. A system according to claim 22 further comprising:
means for mixing sewage sludge with at least one of said first fine fraction and said biodegradable fraction in said composting area.

24. A system according to claim 22 further comprising:
means for forming said first fine fraction and said biodegradable fraction into at least one windrow of compost material.

25. A system according to claim 24 further comprising:
means for diverting a portion of said first fine fraction and said biodegradable fraction into a starter bin;
means for adding at least one of urea, phsudomonas and bacillus bacteria to said diverted portion to form a compost enhancing material; and
means for adding said compost enhancing material to said at least one windrow of compost material.

26. A system according to claim 24 further comprising:
means for fluffing and aerating said material in said at least one windrow; and
means for adjusting the temperature of said compost material in said at least one windrow to a temperature in the range of from about 55° C. to about 65° C. and for maintaining said temperature for at least three days.

27. A system according to claim 24 which further comprises:
a brushed trommel screen; and
means for feeding compost material through said screen to form a marketable compost.

28. A system according to claim 22 further comprising:
means for applying water to said biodegradable and first fine fractions to adjust the solids content to about 40%–60%.

29. A system according to claim 22 wherein said separating means comprises a trommel screen for separating said waste material into said first fine fraction, an intermediate size fraction and a large fraction.

30. A system according to claim 22 further comprising:
means for washing said receiving station with water;
sump means for collecting said washing water and liquid drainage from said waste material;
means for removing solids from said collected wash water and liquid drainage; and
means for applying said collected wash water and liquid drainage to at least one of said first fine fraction and said biodegradable fraction.

31. A system according to claim 22 further comprising:
means for shredding at least some of said removed bulky valuables to form a bulking agent for said compost material.

32. A system according to claim 22 wherein said at least one treatment line further comprises:
means for removing a ferrous metal fraction from said first fine fraction.

33. A system according to claim 22 wherein said at least one treatment line further comprises:
means for removing a second ferrous metal fraction from said comminuted waste material.

34. A system according to claim 33 wherein said at least one treatment line further comprises a vibrating screen conveyor for removing fine debris including dust, glass, grass and leaves from said comminuted waste material, said vibrating screen conveyor being positioned intermediate said second ferrous metal fraction removing means and said third station.

35. A system according to claim 22 further comprising:
an explosion proof chamber surrounding said comminuting means for directing any explosive forces away from personnel and other equipment.

36. A system according to claim 35 wherein said chamber is formed from concrete.

37. A system according to claim 35 further comprising:

means for detecting an explosion within said chamber; and means for suppressing any combustion within said chamber caused by said explosion.

38. A system according to claim 22 further comprising:
HDPE and mixed plastic materials being removed at said first station;
means for melting said HDPE and mixed plastic materials; and
means for forming said melted HDPE and mixed plastic materials into a desired product.

39. A system according to claim 22 further comprising:
means for granularizing removed plastic materials.

40. A system according to claim 22 wherein said at least one treatment line further includes means for baling said paper fraction and means communicating with said third station for deodorizing and removing dust from an air stream used by said third station.

41. A system according to claim 22 wherein each treatment line further comprises:
a secondary means for comminuting oversized particles in said biodegradable fraction.

42. A system according to claim 22 wherein said at least one treatment line is located in an area physically separate from said composting area.

* * * * *